Mar. 3, 1925.
H. MacLEOD
FORK ATTACHMENT
Filed Oct. 29, 1923
1,528,679
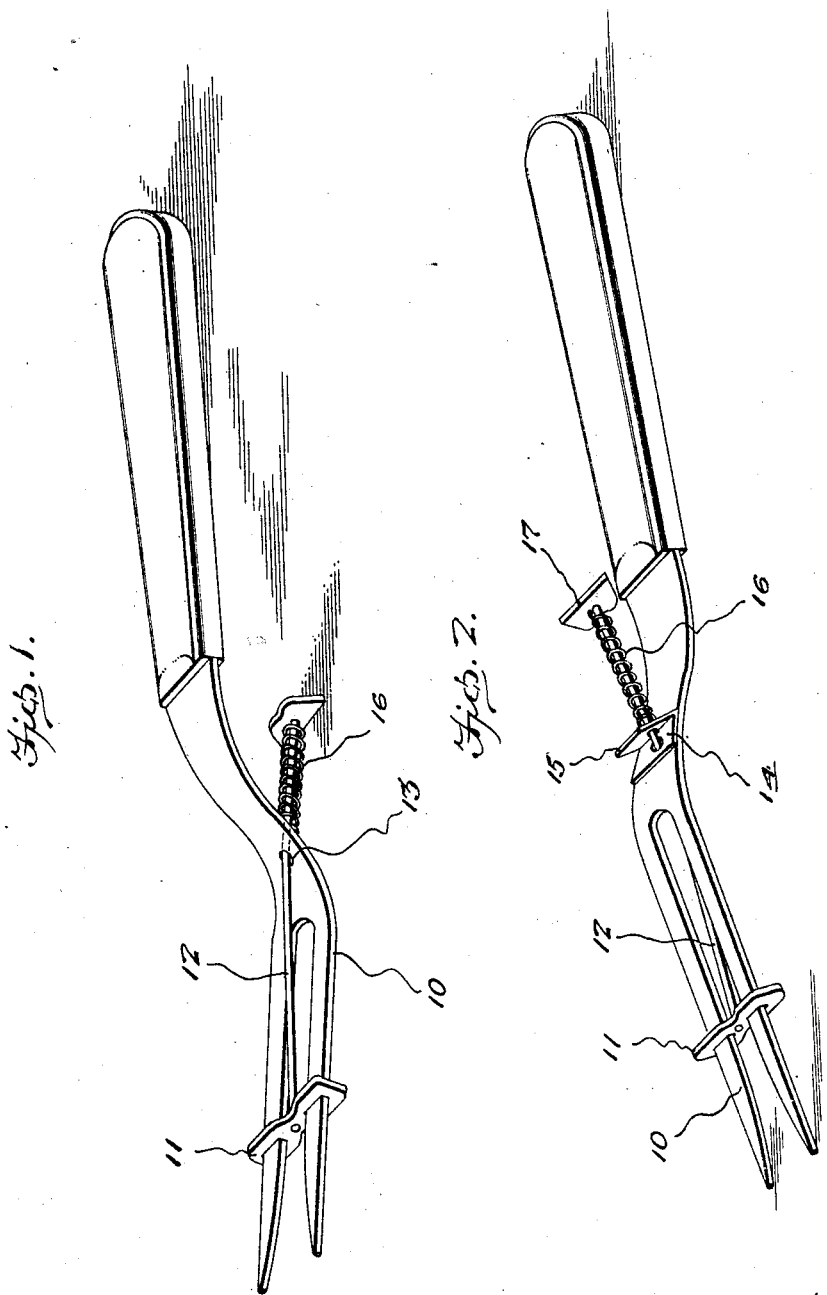

Patented Mar. 3, 1925.

1,528,679

UNITED STATES PATENT OFFICE.

HARRY MacLEOD, OF LANSDOWNE, MARYLAND.

FORK ATTACHMENT.

Application filed October 29, 1923. Serial No. 671,525.

*To all whom it may concern:*

Be it known that I, HARRY MACLEOD, a citizen of the United States, residing at Lansdowne, in the county of Baltimore and State of Maryland, have invented new and useful Improvements in Fork Attachments, of which the following is a specification.

This invention contemplates the provision of a fork attachment designed for a twofold purpose; first, to remove from the fork objects picked up thereby and which have a tendency to remain thereon; and secondly, as a means to support the tines of a fork in spaced relation to a table or other support on which the fork is placed.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view showing the manner in which the attachment is utilized for supporting the tines of the fork in spaced relation to the object on which it is placed.

Figure 2 is a view looking at the back of the fork and showing the manner in which the attachment is associated therewith for use in its other capacity.

Referring to the drawing in detail, A indicates generally a fork of well known construction, wherein the tines of the fork are indicated at 10.

The attachment forming the subject matter of the present invention is in the nature of a slide adapted to move longitudinally of the tines for the purpose of removing therefrom objects picked up by the fork, and which have a tendency to remain thereon. This slide is indicated at 11, and is in the nature of an elongated plate having spaced openings of a shape to correspond to the cross sectional configuration of the tines which they are adapted to receive. The central portion of the plate between the tines is connected to one end of an operating rod 12, the rod extending rearwardly and passed through an opening 13 provided in the body of the fork at a point at the rear of said tines. Arranged upon the rear of body portion of the fork is a substantially V-shaped bracket which can be secured to the fork in any suitable manner, the branches 14 and 15 of said bracket having aligned openings to slidably receive the operating rod 12. It will be noted that the branch 14 of this plate bears against the body of the fork to which it is secured, while the branch 15 is arranged at a proper angle with relation to the body of the fork to provide a substantial bearing for one end of a coiled spring 16 which normally holds the slide in a retracted position on the tines. By reason of the particular angle of the branch 15 of this bracket, the spring is allowed to exert a direct bearing on the thumb piece 17 supported by the rear end of the operating rod 12. In order to remove objects from the fork which have a tendency to cling thereto, it is only necessary to push upon the thumb piece 17 which of course moves the rod 12 and the slide 11 toward the free ends of the tines 10, and at the same time compresses the spring 16, so that when the pressure is removed from the thumb piece 17, the spring functions to return the parts to normal position. It will be noted that this thumb piece 17 is provided with a straight edge, so that when the fork is laid upon a table or other support in the manner shown in Figure 1, practically the entire fork is held in spaced relation to the table or said support, thus protecting the table from being soiled by the fork or the fork from coming into contact with the support for various reasons.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

An attachment for forks having spaced tines and a curved shank and handle, said attachment including a slide having openings to receive said tines, a straight rod having one end positioned between the tines and connected with the slide centrally thereof, the major portion of said rod being disposed above the fork and the remaining portion arranged beneath the fork, said shank having an opening through which the rod passes, a substantially V-shaped bracket secured to the back of the fork and having spaced openings aligned with the opening of said shank to slidably receive said rod, a thumb piece carried by the free end of said rod, a coil spring surrounding the rod and interposed between the bracket and said thumb piece to normally hold the slide retracted upon the tines, and one branch of said bracket being arranged substantially parallel with the thumb piece on said rod whereby the opposite ends of said spring is afforded a substantial bearing for the purpose specified.

In testimony whereof I affix my signature.

HARRY MacLEOD.